No. 837,384. PATENTED DEC. 4, 1906.
A. CHARLES.
MACHINE FOR MAKING NAILS, RIVETS, &c.
APPLICATION FILED JAN. 18, 1905.

Witnesses
H. M. Kuehne
John G. Percival

Inventor
Alfred Charles
By Richardson
ATTORNEYS

No. 837,384. PATENTED DEC. 4, 1906.
A. CHARLES.
MACHINE FOR MAKING NAILS, RIVETS, &c.
APPLICATION FILED JAN. 18, 1905.

Witnesses
Inventor
Alfred Charles

ATTORNEYS

No. 837,384. PATENTED DEC. 4, 1906.
A. CHARLES.
MACHINE FOR MAKING NAILS, RIVETS, &c.
APPLICATION FILED JAN. 18, 1905.

Witnesses

Inventor
Alfred Charles

ATTORNEYS

No. 837,384. PATENTED DEC. 4, 1906.
A. CHARLES.
MACHINE FOR MAKING NAILS, RIVETS, &c.
APPLICATION FILED JAN. 18, 1905.

No. 837,384. PATENTED DEC. 4, 1906.
A. CHARLES.
MACHINE FOR MAKING NAILS, RIVETS, &c.
APPLICATION FILED JAN. 18, 1905.
10 SHEETS—SHEET 9.

UNITED STATES PATENT OFFICE.

ALFRED CHARLES, OF WORCESTER, ENGLAND.

MACHINE FOR MAKING NAILS, RIVETS, &c.

No. 837,384.  Specification of Letters Patent.  Patented Dec. 4, 1906.

Application filed January 18, 1905. Serial No. 241,668.

*To all whom it may concern:*

Be it known that I, ALFRED CHARLES, a subject of the King of England, residing at Alpine Cottage, Tunnel Hill, in the city and county of Worcester, England, have invented new and useful Improvements in Machines for Making Nails, Rivets, &c., of which the following is a specification.

My invention relates to new or improved machinery for making wire nails, rivets, and analogous articles or for heading screw-blanks for making screws; and the invention consists in the novel construction and arrangement of a machine which in the case of nail-making may be termed a "single-wire multiple" machine that shall be capable of manufacturing and producing the nails in numbers by one revolution.

The machine described refers to nail-making, though the other articles named or analogous thereto can equally well be produced by arranging the machine accordingly.

Similar letters of reference indicate corresponding parts in the several figures.

Fig. 3$^a$ is a plan of a part of the machine omitted from Fig. 3. Fig. 4 is a detail in elevation on an enlarged scale. Fig. 5 is a detail in plan of same on an enlarged scale. Fig. 11 is a section, on an enlarged scale, of the cylindrical dies and parts adjacent. Fig. 23 is an elevation of the projecting end of the rack-bar and parts adjacent. Fig. 24 is a plan of same.

$a$ is the bed or frame of the machine, having bearings $a'$ $a'$ near the back end which carry a crank-shaft $b$, provided with a fly-wheel $b'$, and fast and loose pulleys $b^2$, or any other well-known and suitable device for transmitting motion to the machine.

$b^3$ is a crank formed on the shaft $b$. This crank actuates a massive plunger $c$ and plunger-shaft—namely, a connecting-rod $d$. One end is jointed to the plunger at $d'$ by a joint-pin $c'$, and the other end has bearings $d^2$, embracing the crank-pin $b^3$. The plunger $c$ slides backward and forward upon guides $a^2$, formed on or secured to the bed-plate $a$. The plunger $c$ carries a number of heading-dies $c^2$, six in the machine described. Each of these heading-dies $c^2$ may either be screwed or otherwise firmly secured to the end of the plunger $c$ or screwed or secured into a bar $c^3$, fixed in a dovetail slot $c^4$, extending across the front end of the plunger $c$, preferably the latter method, as a differing number of heading-dies $c^2$ can be adapted to the same plunger $c$. The front ends of the heading-dies are formed to make the ends of the wire lengths of the desired shape for the nail-heads.

Figure 1:
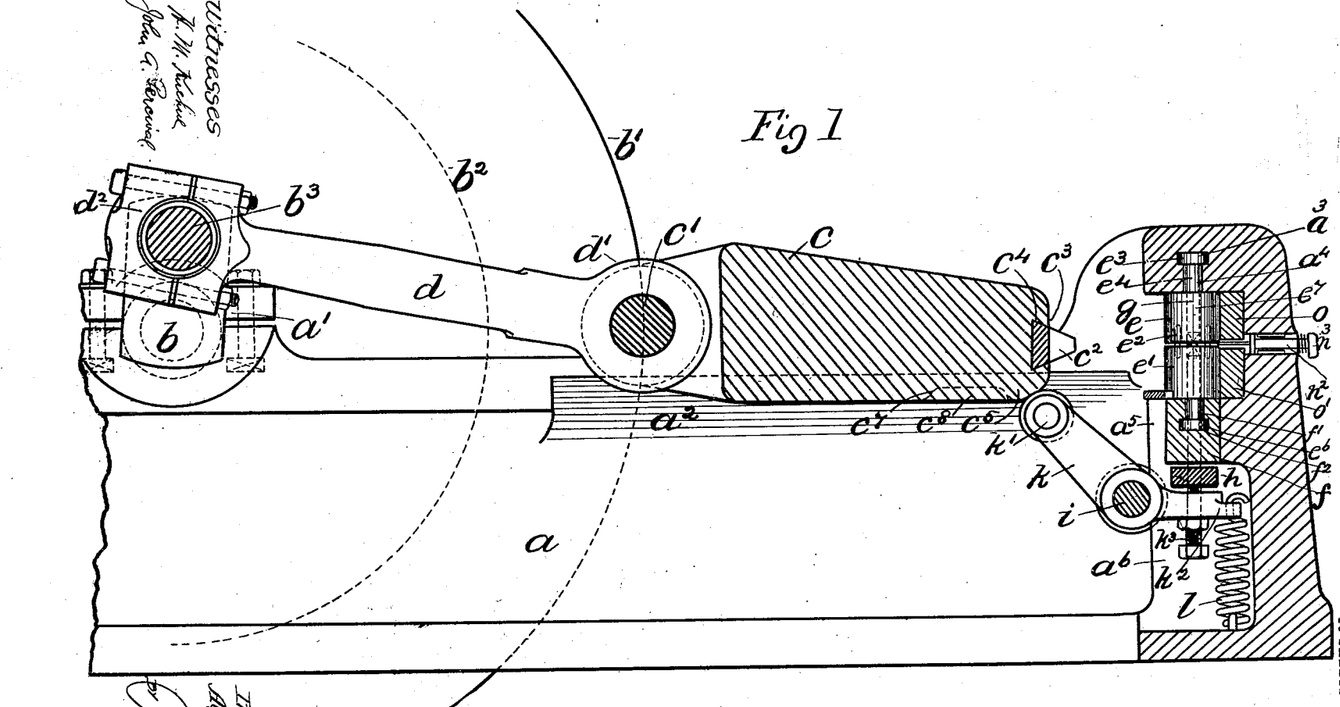
Figure 1 is a longitudinal section of the machine.
Figure 2:
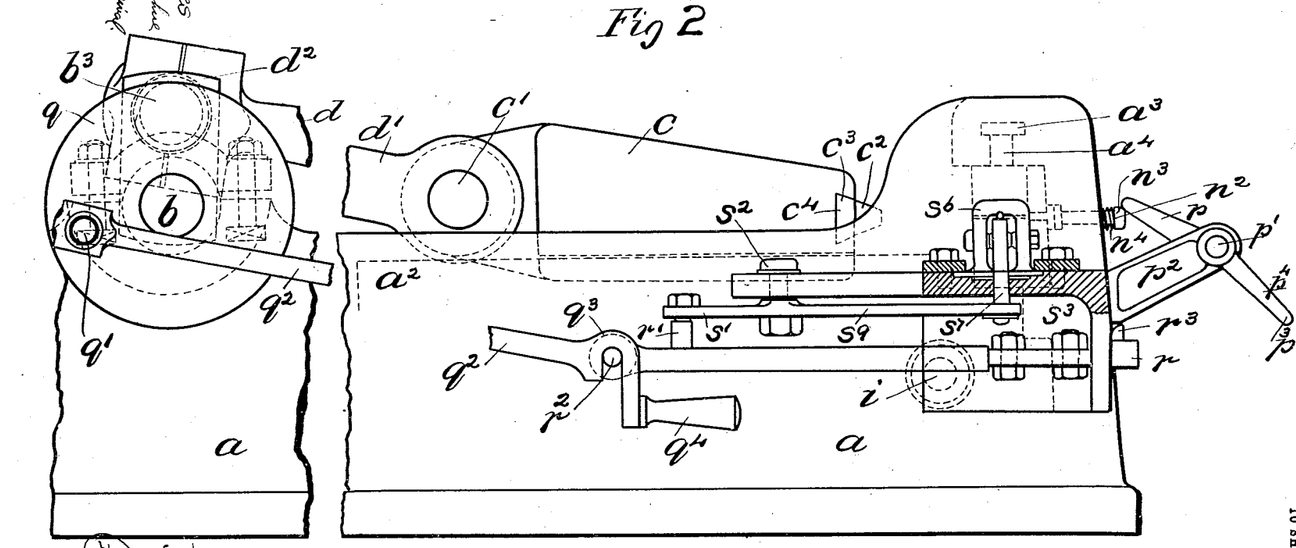
Fig. 2 is a side elevation of the machine with part of the feeding mechanism shown in section.
Figure 2:
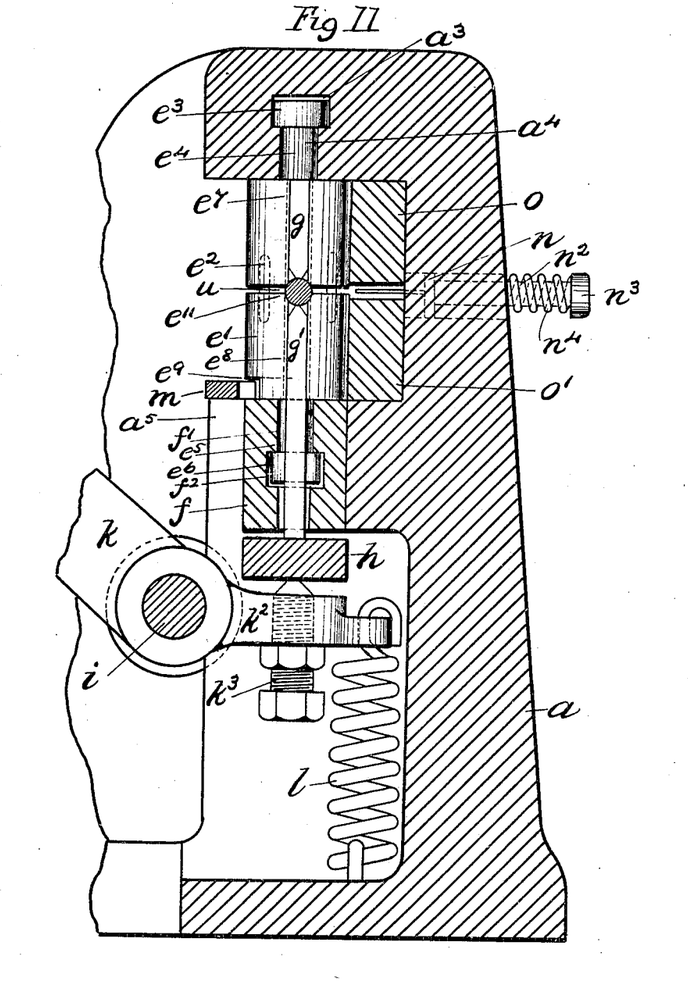
Figure 3:
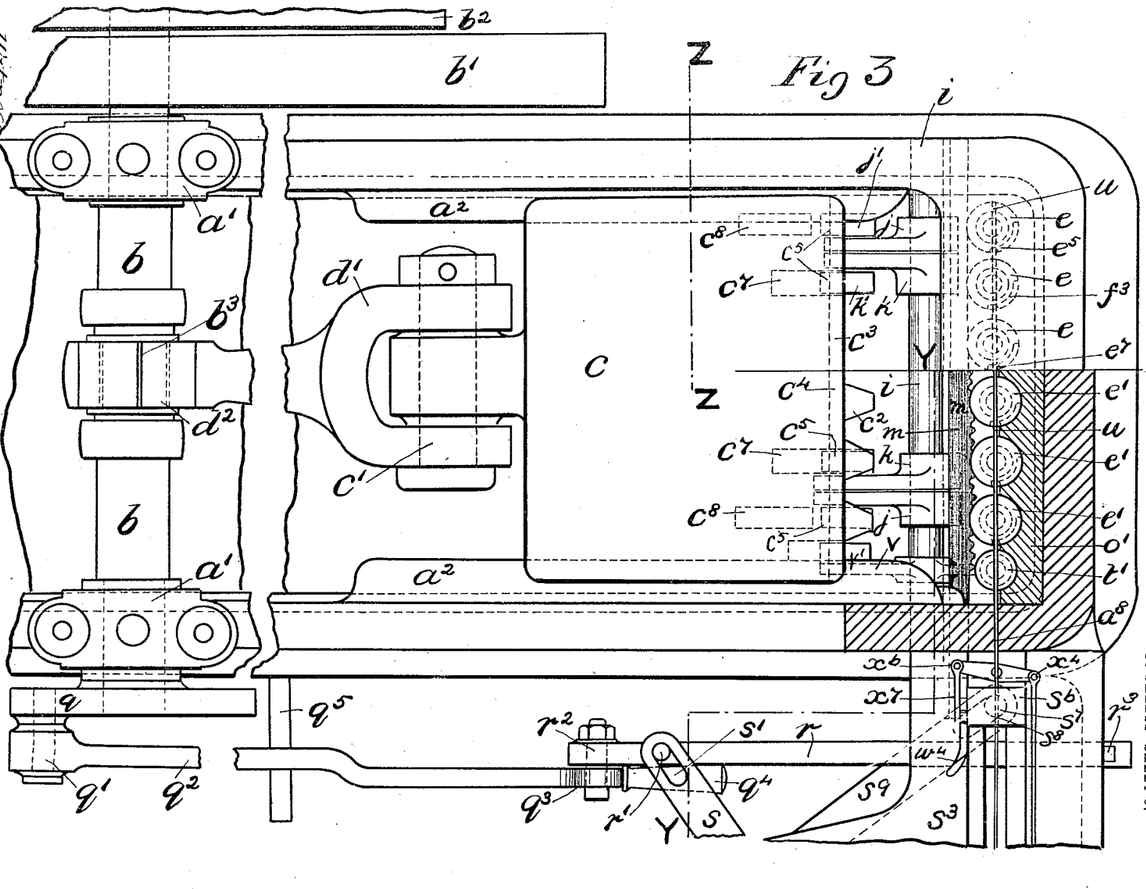
Fig. 3 is a plan of the machine with part shown in sectional plan.
Figures 3A, 4, 5:
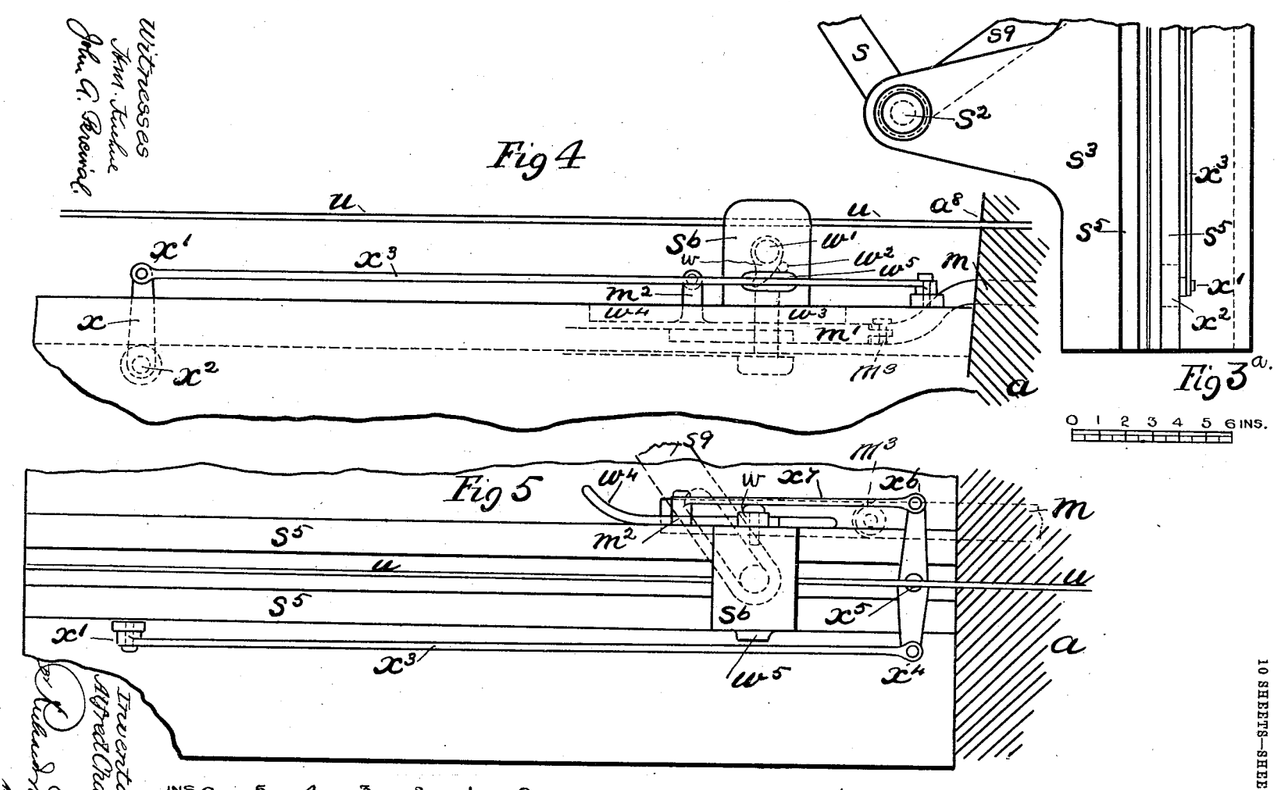
Figure 6:
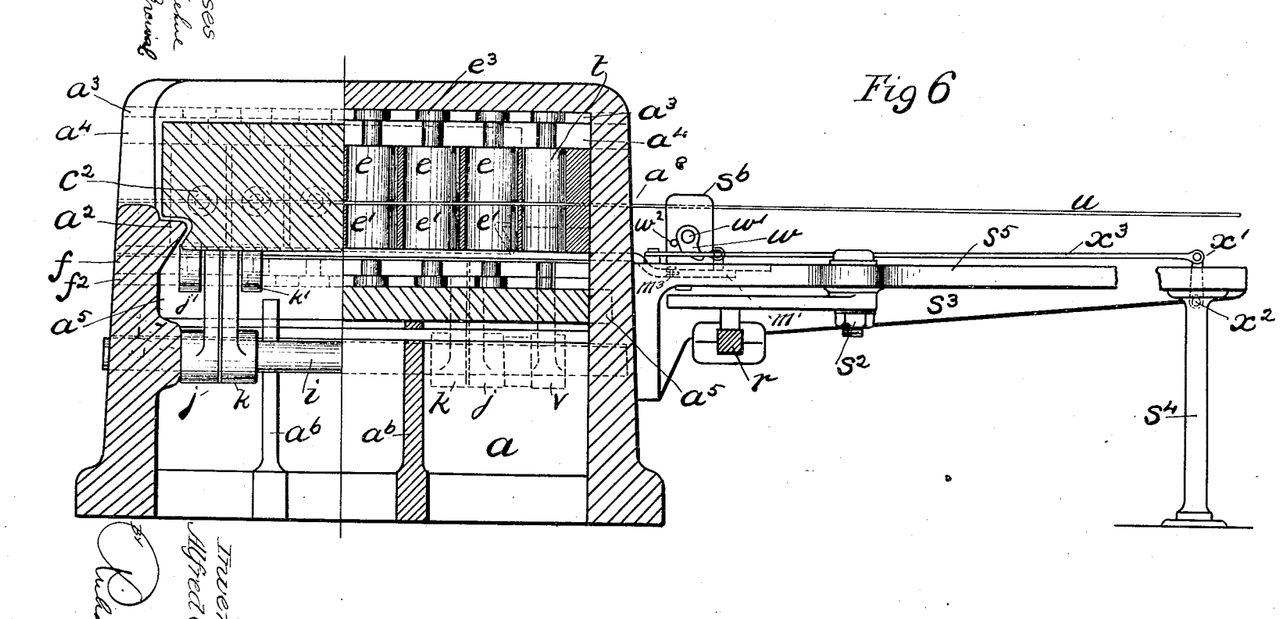
Fig. 6 is a cross-section of the machine, the left-hand half being taken on the line $zz$, Fig. 3, and the right-hand half being a section taken on the line $yy$, Fig. 3.
Figures 7, 8, 9, 10:
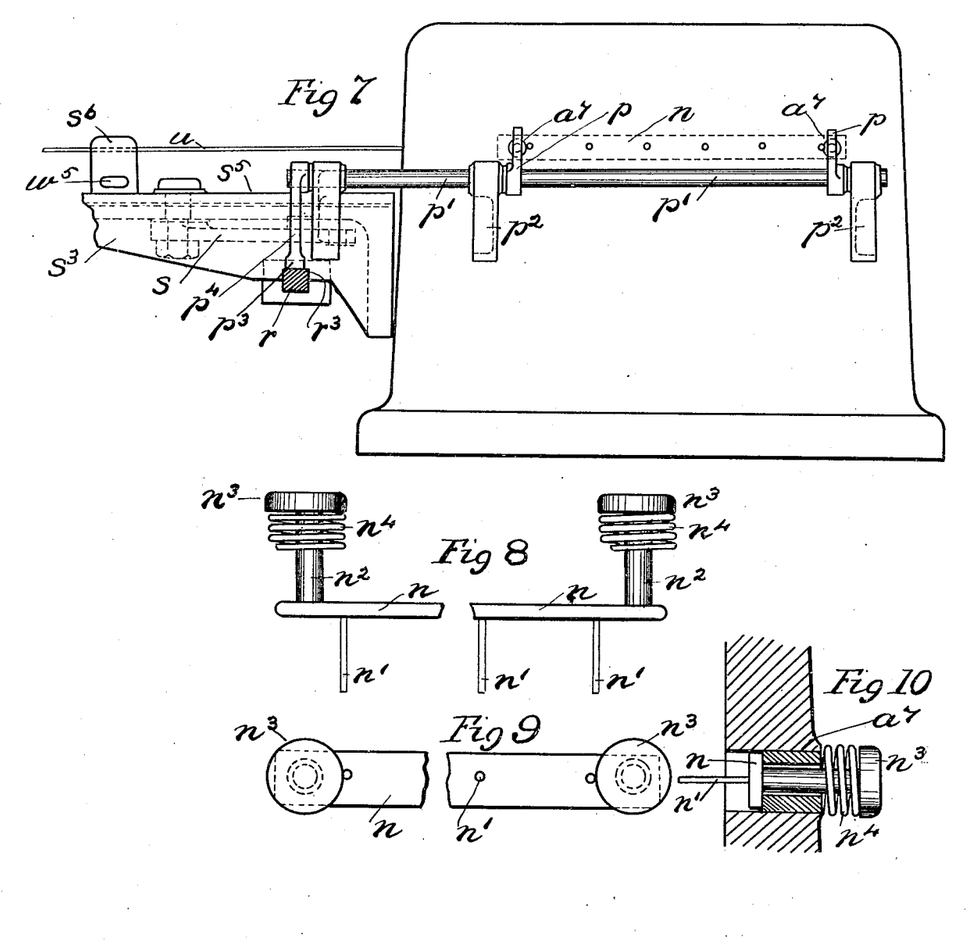
Fig. 7 is a view of the front of the machine.
Fig. 8 is a plan of the clearing device on an enlarged scale.
Fig. 9 is a front elevation of the same on an enlarged scale.
Fig. 10 is a side elevation of the same on an enlarged scale.
Figure 12:
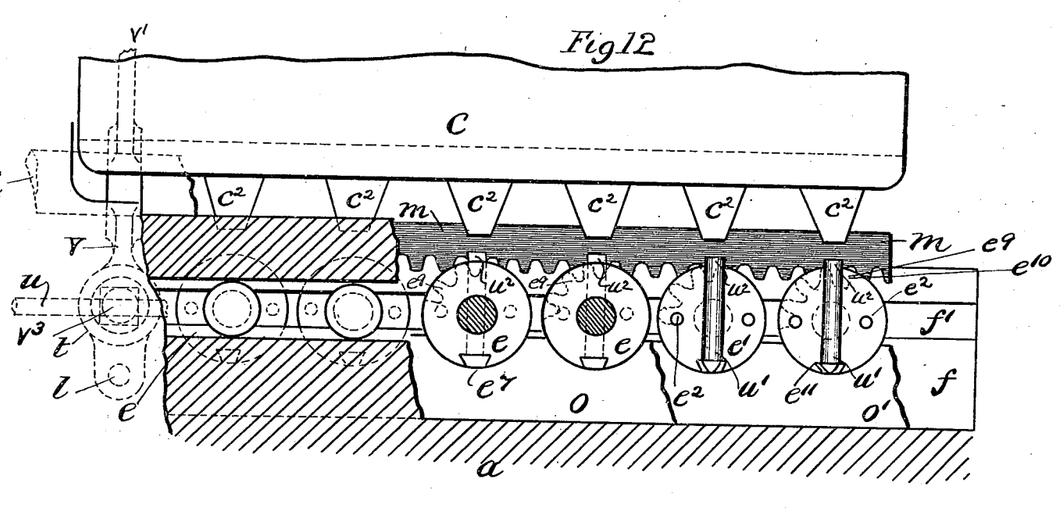
Fig. 12 is a sectional plan, on an enlarged scale, of the cylindrical dies and parts adjacent and showing the dies rotated through an angle of ninety degrees.
Figure 13:
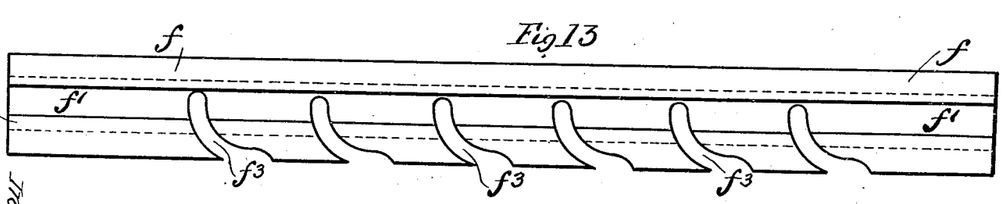
Fig. 13 is a plan, on an enlarged scale, of the gripping lifting cross-bar.
Figure 14:
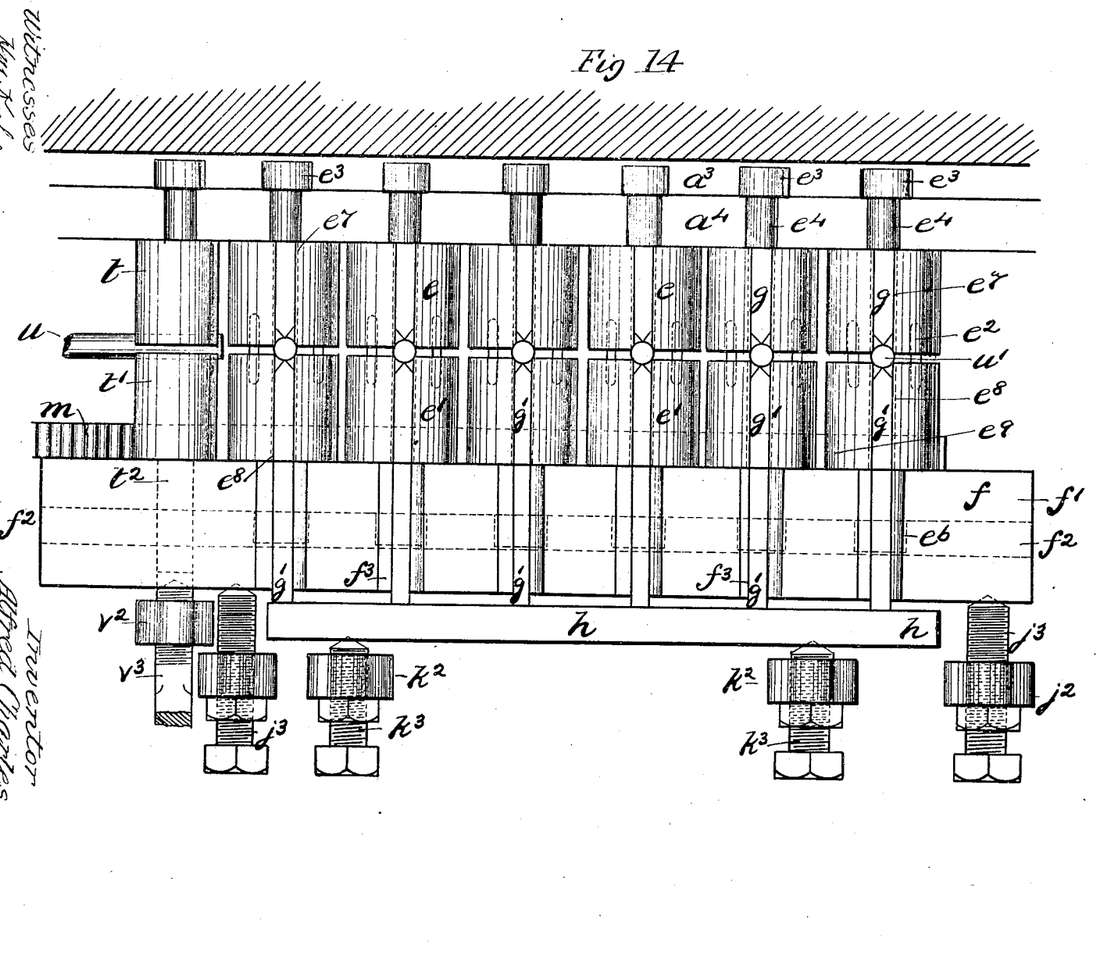
Fig. 14 is a sectional view, on an enlarged scale, of the cylindrical dies.
Figure 15:
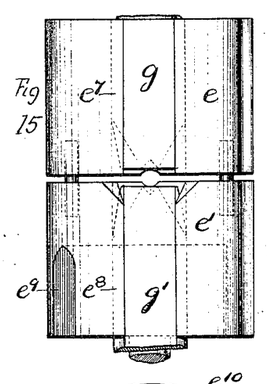
Fig. 15 is an elevation of the upper and lower cylindrical dies, showing the structure of the cutters.
Figure 16:
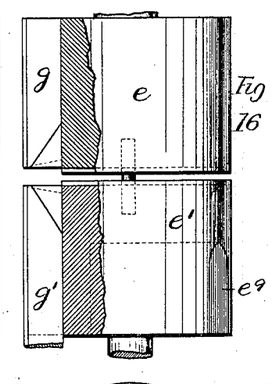
Fig. 16 is a part-sectional elevation of same.
Figure 17:
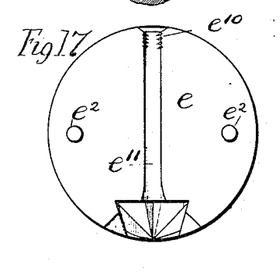
Figs. 17 and 18 are plan views of the opposed surfaces of the dies.
Figure 18:
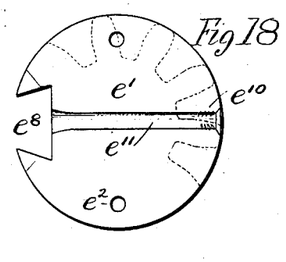

In the dovetail slot $c^4$ may be fixed one long heading bar or die, which will answer the same purpose of separate dies. In front of the plunger $c$ there are a number of cylindrical dies $e$ $e'$, arranged in pairs, an upper and a lower die in each pair. The number of pairs of cylindrical dies is the same as the number of heading-dies $c^2$—namely, six. The size of these dies varies according to the size of the nails to be made by the machine. The diameter of each die is a little less than the length of the wire cut to form each nail. The axes of each pair of upper and lower cylindrical dies coincide and the pairs partly rotate simultaneously. Dowel-pins $e^2$ connect the upper and lower dies, two or more in each pair, and the upper dies are carried by heads $e^3$ of axial pins $e^4$, which may be solid with the dies. The heads $e^3$ can rotate in the slot $a^3$ in the upper part of the front of the bed-plate $a$. The upper dies $e$ are suspended by the heads $e^3$ of the axial pins, which are secured to or form part of the dies, the necks of the axial pins $e^4$ passing through the slot $a^4$ in the framing. The slots $a^3$ and $a^4$ together form a T-shaped slot in cross-section. The lower cylindrical dies $e'$ are carried by similar axial pins $e^5$, having circular heads $e^6$. These axial pins pass through a slot $f'$ in the gripping lifting cross-bar $f$, and the heads $e^6$ can rotate in the slot $f^2$. The slots $f'$ and $f^2$ combined form a T-shaped slot in cross-section similar to the first-named, but inverted. In the gripping lifting cross-bar $f$ there are a number of quadrantal slots $f^3$, six now described. Through these pass the vertical cutters hereinafter referred to. The gripping lifting cross-bar $f$ has a vertical movement in guides $a^5$, formed in or attached to the bed-plate $a$. In each of the upper cylindrical dies $e$ is formed a vertical groove $e^7$, dovetail in cross-section to receive an upper cutter $g$. Each of these cutters is fixed in its groove. (See Figs. 15, 16, and 17.) In each of the lower cylindrical dies $e'$ is a similar dovetail groove $e^8$, Figs. 15 and 18, immediately below the groove $e^7$, and in each groove $e^8$ is fitted a lower cutter $g'$, so as to slide in its vertical groove, and is made sufficiently slack to drop by its own weight as far as it is permitted. The upper parts of the lower cutters $g'$ slide in the dovetail grooves $e^8$ in the lower cylindrical dies $e'$, and their lower ends pass through slots $f^3$ in the cross-bar $f$ and rest on the cross-bar $h$ below.

Figure 19:
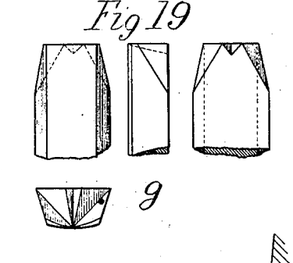
Fig. 19 shows three elevations and a plan of the working end of a cutter.

The lower ends of the cutters $g$ and the upper ends of the cutters $g'$ are formed as the well-known diamond-cutters, (see Figs. 15, 17, and 19,) and when they meet they cut the wire between them so as both to cut and form a point on one piece of cut wire. The cutting lifting cross-bar $h$ has a short vertical movement in guides $a^6$, formed in or secured to the inner side of the bed-plate $a$. These vertical movements are given to the cross-bars $f$ $h$ by two pairs of levers. A shaft $i$ extends across the interior of the machine near the front and forms the common fulcrum of the two pairs of levers. The shaft $i$ does not revolve; but the levers can partially rotate on it. One pair of levers $j$ $j$ actuates the gripping lifting cross-bar $f$, and the other pair of levers $k$ $k$ actuates the cutting lifting cross-bar $h$. The levers $j$ $j$ and $k$ $k$ are provided with rollers $j'$ $k'$ at the ends of their back arms. These rollers are depressed when required by projections $c^5$ on the under side of the plunger $c$, and at the proper times in the cycle of operations of the machine the projections $c^5$ on the plunger $c$ by its movement toward the front of the machine depress the ends of the levers at $j'$ $k'$, and the other ends $j^2$ $k^2$ are at the same time raised, and thus they raise their respective cross-bars $f$ and $h$. The front ends of the levers $j^2$ $k^2$ have set-screws $j^3$ $k^3$ for adjustment. When the plunger $c$ has proceeded forward far enough, the recesses $c^7$ $c^8$ in its under side are by its movement brought over the ends $j'$ $k'$ of the levers, this permitting the back ends of the levers to rise into the recesses, and then their front ends $j^2$ $k^2$ drop and the cross-bars $f$ and $h$ also drop. To assist in making this action quick and certain, a strong helical spring $l$ is placed under the front end of each lever, and the upper end of the spring is secured to same and the lower end to the frame $a$ of the machine. The action of the two pairs of levers is similar, and so they have been described together. They are not simultaneous, but one follows the other in a predetermined order and amount, being determined by the shape of the projections $c^5$ or cam-formed parts on the plunger $c$. The exact configuration of these parts is not shown, as it is a matter of detail.

The front ends of the levers $k$ $k$ actuate the cutting lifting cross-bar $h$, and the front ends of the levers $j$ $j$ actuate the gripping lifting cross-bar $f$, as is shown. The gripping action on the wire $u$ is caused by the lower cylindrical dies $e'$ being slightly raised while the upper ones $e$ remain stationary, these dies being suitably formed at $e^{10}$ so as to put what is known as the "cord" on the nails when the grip takes place. (See Figs. 17 and 18.) The lower face of each upper die $e$ and the upper face of each lower die $e'$ has a groove $e^{11}$, in which the wire lies. The cylindrical dies $e$ and $e'$ have an intermittent motion of partial rotation given to them through an angle of ninety degrees by rack-bar $m$, extending across the machine at the back of the lower cylindrical dies $e'$, teeth on this rack $m$ engaging in teeth $e^9$ on the lower edge of the lower cyindrical dies $e'$. These teeth do not extend all round the whole circumference of each die, but only over a little more than one-quarter of it, so that the rack may move the bottom dies through a quarter of a revolution—that is, ninety degrees—about the vertical axes of the dies, the upper dies $e$, being doweled to the lower dies $e'$, have a simultaneous angular motion. The cylindrical dies $e$ $e'$ are held in their places by upper and lower backing bars or blocks $o$ $o'$, the dies fitting into corresponding recesses in same. The rack-bar $m$ is guided in each side of the frame and is furnished with a joint $m^3$, whereby the part $m'$ may move as guided by the curved slot $w^4$ without moving the rack $m$ away from the teeth of the dies, as hereinafter described.

Situated at the front of the machine is the device for clearing the dies of the nails after they are made. This consists of a clearing cross-bar $n$, extending across the interior of the front part of the framing of the machine at the level of the space between the upper and lower cylindrical dies $e$ $e'$. This clearing cross-bar $n$ has a number of knocking-out tools $n'$, the same number as the sets of dies. These tools strike the points of the nails when they are made and knock them out of the dies $e$ $e'$. The cross-bar $n$ is provided with two plungers $n^2$, one near each end of the cross-bar, which plungers pass through the front of the bed plate or framing of the machine at $a^7$, and their front or outer ends are provided with heads $n^3$. Between these heads and the framing of the machine are helical springs $n^4$, which keep the clearing cross-bar $n$ and its knocking-out tools $n'$ to the front of the machine and out of the way while the nails are being made. The clearing cross-bar is actuated by striking-levers $p$, secured to an oscillatory or weigh shaft $p'$, extending across the front of the machine and which can partially rotate in bearings $p^2$, formed on or bolted to the frame or bed plate $a$. The weigh-shaft and its striking-levers obtain their motion as described hereinafter.

Referring to the means by which the wire is fed into the machine and the means by which the motion is given to the mechanism by which the finished nails are ejected, and also to the means by which the intermittent quadrantal axial motion is given to the cylindrical dies $e$ and $e'$, all these motions are derived from a crank $q$, situated at the end of the crank-shaft $b$. The pin $q'$ of this crank gives motion by a connecting-rod $q^2$ to a sliding bar $r$, moving backward and forward in fixed guides. On the upper side of the sliding bar $r$ is a pin $r'$, engaging in a slot $s'$ in the one arm of a bell-crank $s$ above it, vibrating upon a fixed fulcrum-pin $s^2$, carried by a bracket $s^3$, secured to the side of the machine. The outer end of this bracket is supported, preferably, by a pillar $s^4$. The connecting-rod $q^2$ has a gab end $q^3$, which takes onto the pin $r^2$ on the end of the sliding bar $r$. The gab end has a handle $q^4$ for lifting it off the pin $r^2$, and the connecting-rod $q^2$ is allowed to slide idly on a stud $q^5$. Thus the whole of the mechanism which derives its motion from the crank $q$ can be instantly stopped, if required, without interfering with the running of the rest of the machine in case of anything going wrong with the feed. The front end of the sliding bar $r$ has a projection $r^3$ upon it, and when at nearly its extreme forward position this projection engages with the end $p^3$ of a lever $p^4$, which is keyed or otherwise secured to the end of the weigh-shaft $p'$. The projection $r^3$ on the bar $r$ and the end $p^3$ of the lever $p^4$ are so formed that when this happens the lever $p^3$ receives a violent jerk, which being transmitted through the weigh-shaft $p'$ and the lever $p$ to the plunger-heads $n^3$ and thence to the clearing cross-bar $n$ and knocking-out tools $n'$ the finished nails are cleared from the dies.

The bracket $s^3$ has upon its surface guides $s^5$, in which slides the feeding-die $s^6$, the reciprocating motion of which is at right angles to that of the heading-die—namely, the feed of the machine is at the side and not at the front, as is usual in nail-making machines. The feeding-die $s^6$ has a motion of the same length as that of the combined length of the nails which the machine will make in one revolution, (six in the machine described,) the reciprocating motion of the feeding-die $s^6$ being derived from the arm $s^9$ of the bell-crank, to which it is jointed by a pin $s^7$ working in a slot $s^8$ in the bell-crank.

The action of the feeding-die itself in gripping and releasing the wire is well known and does not form part of this invention.

The wire with which the machine is fed is supplied at the end of the feed-bracket above the support $s^4$, and it is seized by the feeding-die and fed through the side of the machine-framing at $a^8$. A pair of guides $t$ $t'$ are provided which receive the wire $u$ from the feeding-die $s^6$ and passes it to the cylindrical dies $e$ $e'$. The rack-bar $m$, which, as stated, is guided in each side of the frame of the machine so as to have a rectilinear motion, and thereby is kept in engagement with the teeth on the dies, receives its intermittent reciprocating motion thus: The feeding-die $s^6$ has on one side of it a hanging contact-block $w$, suspended by a pin $w'$. This contact-block moves freely in one direction, but not in the other, as a stop $w^2$ is fixed in the die to limit the motion. The end piece $m'$ of the rack-bar is jointed to the body or principal part of the rack-bar $m$ at $m^3$, Figs. 23, 24, so as to allow of its outer end having some latent motion, while the body of the rack-bar $m$ being guided in the sides of the frame has only a rectilinear motion. Attached to the outer end of the piece $m'$ is a short arm $m^2$, projecting upward through a slot which is straight at $w^3$ and parallel to the direction of motion of the feeding-die, but is curved outward at $w^4$. When the feeding-die is moved in the direction away from the machine by the action of the bell-crank $s$, the lower end of the contact-block $w$ catches the end of the arm $m^2$ and moves it along with the feeding-die as far as the slot $w^3$ remains straight and parallel with the guides $s^5$; but when the arm $m^2$ reaches the curved part of the slot at $w^4$ it is moved aside, and the contact-block $w$ in its continued motion clears it, and the motion of the arm $m^2$ and of the rack $m$ ceases. It is brought back to its original position thus. On the other side of the feeding-die $s^6$ from the hanging contact-block $w$ is a fixed contact-block $w^5$. When the feeding-die $s^6$ has gone a sufficient distance along the guide $s^5$, this contact-block $w^5$ strikes the end $x'$ of a lever $x$, which has its fulcrum at $x^2$, and the motion of the feeding-die still continuing, carries the end $x'$ on the lever $x$ with it, which is connected by a rod or link $x^3$ with one end $x^4$ of an equal-armed lever fulcrumed at $x^5$. The other end of this lever $x^3$ is connected with the arm $m^2$ by the link $x^7$. Thus when the end $x'$ of the lever $x$ is moved in the direction away from the machine by the contact-block $w^5$ it brings back the rack-bar $m$ to its original position by the lever and links $x^3$ $x^4$ $x^5$ $x^6$ $x^7$. As the contact-block $w$ is suspended from the pin $w'$ it passes on its return over the projecting arm $m'$ without moving it, as the lower end of the contact-block rises and allows the end of the arm $m^2$ to pass under it. The guides $t$ $t'$ grip the wire $u$ at the proper time by a lever $v$, similar to the levers $j$ $j$ $k$ $k$, fulcrumed on the same shaft $i$, and is actuated like $j$ $j$ and $k$ $k$ by a projection on the under side of the plunger $c$ acting on its back end $v'$. The front end $v^2$ of the lever raises the axis $t^2$ of the lower guide-die $t'$, which is prolonged downward through the gripping lifting-bar $f$ for that purpose. The end $v^2$ of the lever $v$ has an adjusting set-screw $v^3$.

The wire for making the nails is supplied to the machine from an ordinary coil, and the length of wire fed in at each stroke of the feeding-die must be sufficiently long to make six nails. The feeding-die $s^6$, being at the extreme of its travel farthest from the machine, grips the wire $u$ and draws it through a well-known straightening device. (Not shown.) It then pushes the wire through the opening $a^8$ in the side of the framing and between the guides $t$ $t'$ and along the grooves $e^{11}$ in the faces of the dies $e$ $e'$. These cylindrical dies are at this time stationary, so that the wire $u$ can be pushed by the feed until it lies between the whole set of pairs of dies $e$ $e'$. The gripping lifting cross-bar $f$ is then slightly lifted by the projection on the under side of the plunger $c$ pressing on the back ends of the levers $k$ $k$. This lifts all the lower dies $e'$ simultaneously and grips the wire $u$ between the upper and lower cylindrical dies $e$ $e'$. While the wire $u$ is thus firmly gripped the lower cutters $g'$ are raised in the dovetail grooves $e^8$ by the cutting lifting cross-bar $h$, actuated by the back ends of the levers $j$ $j$. These cutters meeting the upper cutters $g$ cut the wire $u$ into proper lengths for the nails, and at the same time by their peculiar shape (being diamond-cutters) they form the points of the nails. The grip is now relaxed by the conformation of the under side of the plunger $c$, where it acts on the levers $k$ $k$, and the whole sets of cylindrical dies $e$ $e'$ are then simultaneously rotated through an angle of ninety degrees (one-quarter turn) by the motion of the rack $m$ acting on the teeth $e^9$ on the lower edges of the cylindrical dies $e'$. The object of the quadrantal slots $f^3$ in the gripping cross-bar $f$ is to allow the lower ends of the cutters $g'$ moving through an angle of ninety degrees and still to remain on the cutting cross-bar $h$. The gripping lifting cross-bar $f$ is now slightly raised again by the configuration of the under side of the plunger $c$ acting on the levers $k$ $k$, and the short lengths of wire $u'$ are firmly gripped and the cord put on them by the cylindrical dies at $e^{10}$. The motion of the main crank by this time brings forward the plunger $c$, so that the heading-dies $c^2$ form the heads of the nails by pressure on the projecting ends of the lengths of wire at $u^2$. The nails having now been made, the grip on them is released, and the knocking-out tools $n'$ give the points of the nails a simultaneous blow and disengages them from the dies, throwing them backward. They then fall out.

The knocking-out tools $n'$ are actuated by the projection $r^3$ of the sliding bar $r$ striking the lever $p^3$, as described. As soon as the knocking-out tools have acted they are automatically returned to their normal position by the helical springs $n^4$ acting on the under side of the heads $n^3$ of the plungers, which are connected to the clearing-bar $n$. The rack $m$ then returns to its first position, bringing back the cylindrical dies $e$ $e'$. The cycle of operations is now completed and the machine is ready to take in a further supply of wire.

In the machine described and illustrated six nails are made at each revolution of the main shaft; but the machine can be made to make a greater or less number, according to the number of sets of dies used, and although the word "nails" is used to denote the finished product by providing suitable dies and cutters either nails, rivets, screw-blanks, and other analogous articles are made.

Figure 20:
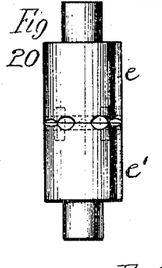
Fig. 20 is an elevation of the upper and lower dies for making other articles than nails, such as rivets. These dies are not provided with sliding cutters.
Figure 21:
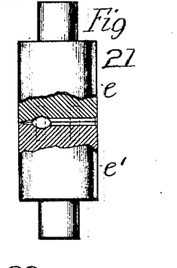
Fig. 21 is a part section of same.
Figure 22:
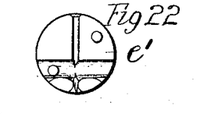
Fig. 22, a plan of the meeting surface of the dies.

In making small nails or rivets when the wire is of small diameters the vertical cutters $g$ $g'$ in the dies $e$ $e'$ can be dispensed with and also the lifting cutting cross-bar $h$, also the levers $k$ $k$, as by making the meeting edges of the cylindrical dies $e$ $e$ of suitable shape the wire or stock may be cut into lengths by the lifting action of the lower dies $e'$ given by the gripping lifting cross-bar $f$, actuated by the levers $j$ $j$. The configuration of these dies is shown in Figs. 20, 21, 22. The means of holding and of partly rotating these dies is not shown in the drawings. They have already been fully described.

What I claim is—

1. In a nail-making machine, the combination of a bed-plate, a plunger reciprocating thereon, a plurality of heading-dies connected to said plunger, cylindrical dies arranged in pairs in front of the plunger coöperating with the heading-dies, each pair comprising an upper and lower die, said dies having alined transverse grooves $e^{11}$ therein adapted to receive the wire, means for feeding the wire to the dies, means for cutting the wire adjacent each pair of dies, dowel-pins $e^2$ connecting the dies of each pair together, pins having heads connected to the upper end of the upper die and the lower end of the lower die, said bed having slots therein in which the pins of the upper dies are rotatably held, a cross-bar $f$ having vertical movement in the bed, said bar having slots therein in which the pins of the lower dies engage, means for partially rotating the dies and means for raising the bar $f$ to raise the lower dies to grip the wire, substantially as described.

2. In a nail-making machine, the combination of the bed-plate, upper cylindrical dies having vertical dovetail grooves in their sides, cutters in said grooves, lower cylindrical dies having vertical grooves therein in alinement with the grooves in the upper dies, sliding cutters in said grooves, a lifting cross-bar $f$ having vertical movement in the bed-plate, said bar having quadrantal slots therein through which the lower ends of the cutters in the lower dies pass, a cross-bar $h$ on which the ends of the sliding cutters rest, means for lifting the cross-bars $f$ and $k$, and means for partially rotating the dies.

3. In a nail-making machine, the combination of a reciprocating plunger, heading-dies thereon, cylindrical dies arranged in pairs in front of the plunger and having alined grooves, means for feeding the wire between the alined grooves of each pair of dies, means for bringing the dies together to grip the wire, cutters carried by said dies, means for operating the cutters to cut the wire, and means for rotating the dies to bring the end of the wire opposite the corresponding heading-die whereby said heading-die will form the head.

4. In a nail-making machine, the combination of a reciprocating plunger, heading-dies thereon, cylindrical dies arranged in pairs in front of the plunger and having alined grooves, an upper and lower die in each pair, means for feeding wire into the grooves on said dies, cutters carried by said dies, a cross-bar on which the lower dies rest, a second cross-bar on which the ends of the cutters of the lower dies rest, means operated by the plunger for raising both cross-bars to grip the wire and to cut the same and means for rotating the dies so as to bring one end of the nail opposite the corresponding heading-die on the plunger to form the head.

5. In a nail-making machine, the combination of cylindrical dies $e$, having vertical dovetailed grooves therein, cutters $g$ in said grooves, cylindrical dies $e'$ having dovetailed grooves therein, cutters $g'$ having sliding movement in said grooves, a gripping lifting cross-bar $f$ having slots therein through which the sliding cutters pass, said bar $f$ carrying the dies $e'$, a lifting cross-bar $k$ situated below the bar $f$, the ends of the sliding cutters resting on said bar $k$, a shaft $i$, the pairs of levers fulcrumed on said shaft for raising the cross-bars, means for actuating said levers and springs for controlling said levers.

6. In a machine for making nails, the combination of a bed-plate, cylindrical dies $e$, cylindrical dies $e'$, dowel-pins connecting both sets of dies, said dies $e'$ having teeth on one-quarter of their circumference, backing-bars $o$ $o'$ having curved recesses within which the dies fit, receiving-dies $t$ $t'$, an axis $t^2$ in the die $t$, means for raising said axis $t^2$, a lifting cross-bar $f$ on which the dies $e'$ and the die $t'$ rest, means for giving said bar vertical movement, a rack-bar $m$ having teeth adapted to engage with the teeth of the dies $e'$, a feeding-die $s^6$ adapted to feed the wire to the receiving-dies $t$ $t'$, a contact-block $w$ suspended from the die $s^6$, a stop $w^2$ on die $s^6$ for limiting the movement of the block $w$, a contact-block $w^5$ on the opposite side of the die $s^6$, the guide $s^5$ for the die $s^6$, slot $w^3$ having the curved end $w^4$ in which the block $w$ engages, an arm $m^2$ attached to the rack-bar $m$ with which the block $w$ engages when the die $s^6$ is moved back from its feeding stroke so as to rotate the dies $e$ $e'$, the curve $w^4$ serving to disengage the block $w$ from the arm $m^2$ and a lever $x$ fulcrumed at $x^2$ and having link connection with the arm $m^2$, said lever being adapted to be engaged by the contact-block $w^5$ on the backward movement of the die $s^6$, so that said lever and its connections will return the rack $m$ to normal position.

7. In a nail-making machine, the combination of the bed-plate, the cylindrical dies carried thereby, each pair of said dies comprising an upper and lower die, means for holding the wire transversely between the dies of each pair, and means for knocking the finished nail therefrom, said means consisting of a cross-bar $n$, knocking-out tools $n'$ connected thereto, plungers $n^2$, having heads $n^3$, secured to said bar $n$, said plungers passing through the bed-plate, springs $n^4$ between said heads $n^3$ and the bed-plate, a weigh-shaft $p'$ connected to the bed-plate, striking-levers $p$ carried by said shaft and adapted to contact with the heads $n^3$ to force the tools into contact with the nails, a sliding bar $r$, a pin $r'$ thereon, a bell-crank $s$ suitably pivoted to the bed-plate, one end of said bell-crank having a slot therein with which the pin $r'$ engages, a crank, a rod $q^2$ connecting the crank with the bar $r$, means for disengaging the rod $q^2$ from the bar $r$, a projection $r^3$ on the bar $r$, a lever $p^4$ secured to the shaft $p'$, with which the projection $r^3$ engages whereby the shaft $p'$ will be rocked, a feeding-die $s^6$ for feeding the wire to the cylindrical dies and guides $s^5$ in which said die $s^6$ reciprocates; said die $s^6$ being operated by the arm $s^9$ of the bell-crank.

8. The combination in a machine for making wire nails and the like, a reciprocating plunger for forming the nail-heads, cylindrical dies, means for bringing the dies together to grip the wire, means for cutting the wire, means for rotating said dies and means for feeding the wire from the side of the machine and at right angles to the plunger to the dies, substantially as described.

In testimony whereof I have signed my name to this specification in the presence of two subscribing witnesses.

ALFRED CHARLES.

Witnesses:
EDWD. BURTON PAYNE,
PHILIP C. PAYNE.